W. H. PORTER.
APPARATUS FOR MEASURING OR INDICATING THE DENSITY OF LIQUIDS IN CONTAINERS.
APPLICATION FILED OCT. 1, 1921.
1,410,836.
Patented Mar. 28, 1922.
5 SHEETS—SHEET 1.
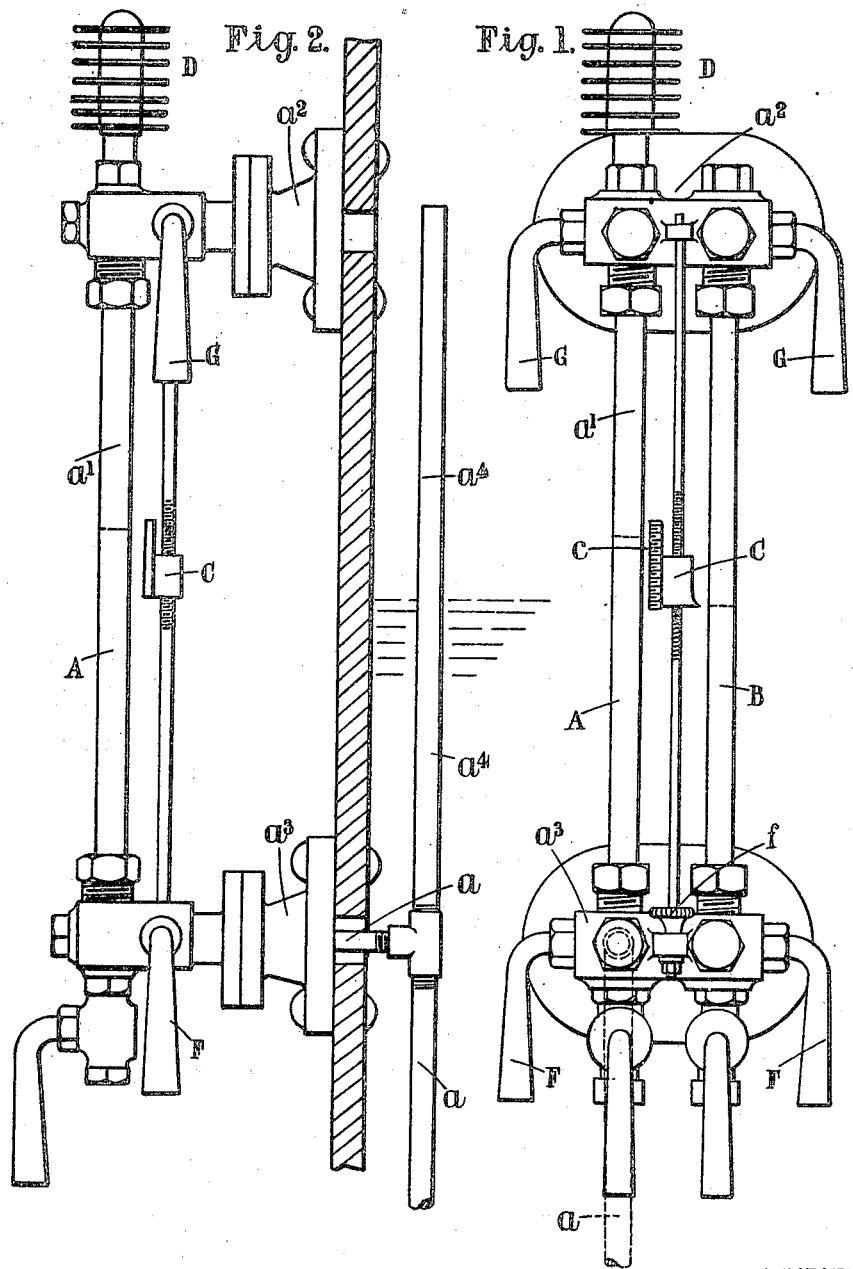
INVENTOR
W. H. Porter
by
Hubert A. Gill
Attorney

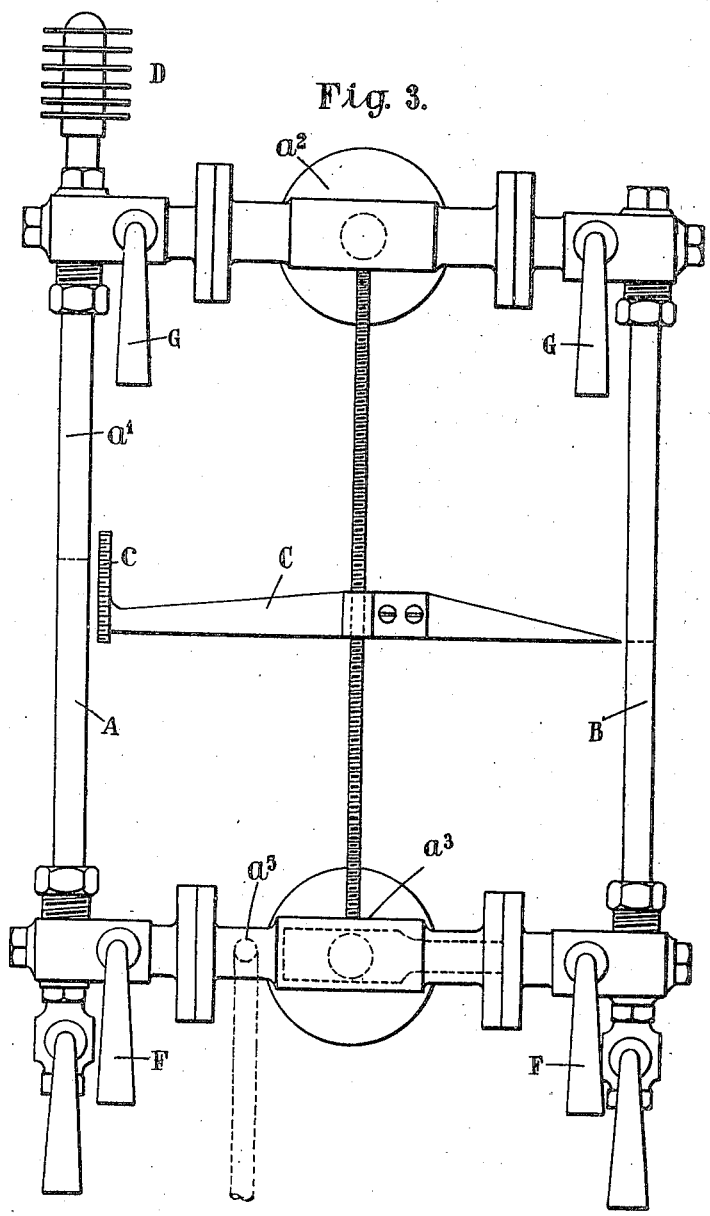

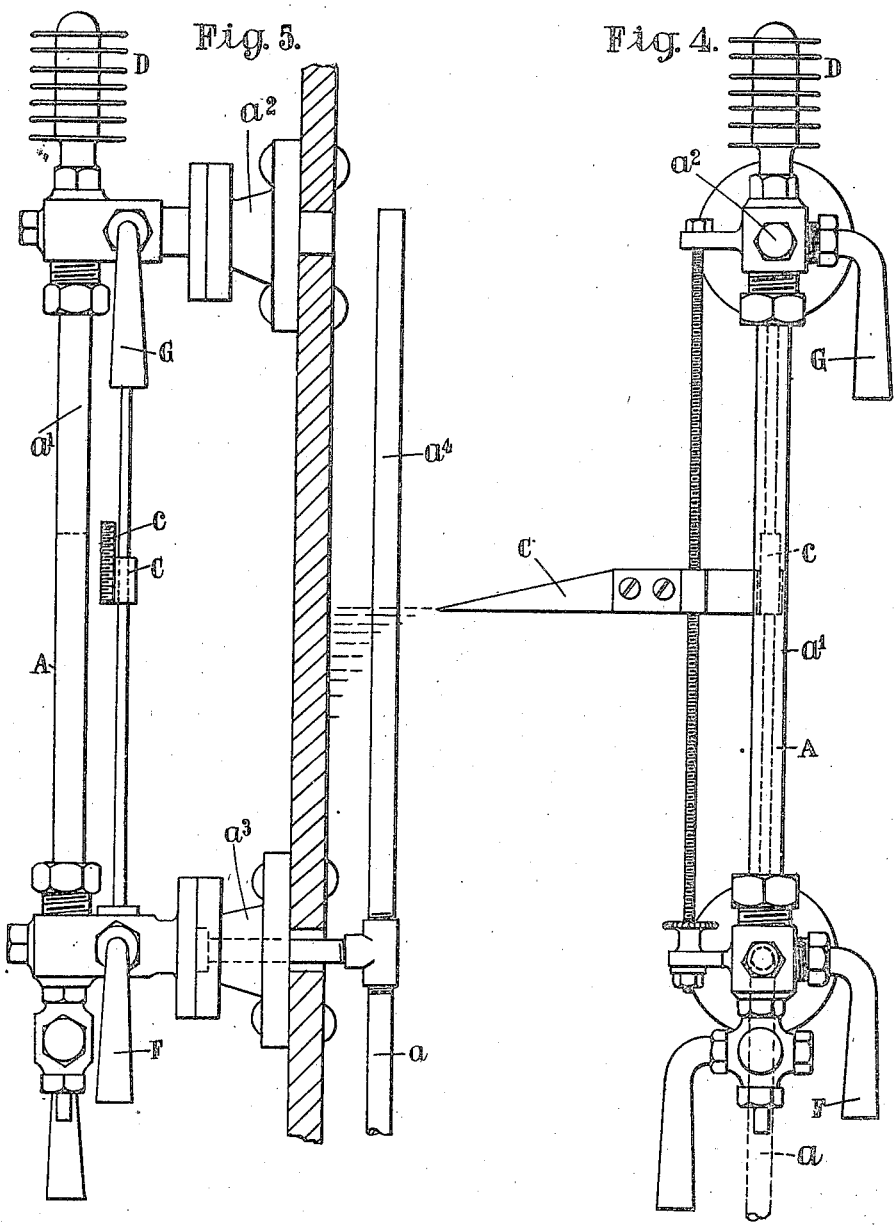

W. H. PORTER.
APPARATUS FOR MEASURING OR INDICATING THE DENSITY OF LIQUIDS IN CONTAINERS.
APPLICATION FILED OCT. 1, 1921.

1,410,836.

Patented Mar. 28, 1922.

INVENTOR
W. H. Porter
by
Hubert A. Gill
Attorney

W. H. PORTER.
APPARATUS FOR MEASURING OR INDICATING THE DENSITY OF LIQUIDS IN CONTAINERS.
APPLICATION FILED OCT. 1, 1921.

1,410,836.

Patented Mar. 28, 1922.
5 SHEETS—SHEET 5.

INVENTOR
W. H. Porter
by
Hubert A. Gill
Attorney.

UNITED STATES PATENT OFFICE.

WILFRID HAROLD PORTER, OF FLIXTON, ENGLAND, ASSIGNOR OF ONE-HALF TO JACOB WILLIAM SPENSLEY, OF MANCHESTER, ENGLAND.

APPARATUS FOR MEASURING OR INDICATING THE DENSITY OF LIQUIDS IN CONTAINERS.

1,410,836.　　　　　　　Specification of Letters Patent.　　Patented Mar. 28, 1922.

Application filed October 1, 1921. Serial No. 504,794.

*To all whom it may concern:*

Be it known that I, WILFRID HAROLD PORTER, a subject of the King of Great Britain, and resident of Whitelake Avenue, Flixton, in the county of Lancaster, England, have invented certain new and useful Improvements in Apparatus for Measuring or Indicating the Density of Liquids in Containers, (for which I have filed an application in England, dated September 28th, 1920,) of which the following is a specification.

This invention relates to apparatus for measuring and indicating the density of the water in steam boilers, or the density of other liquids in plants where liquid is being evaporated.

The density of the water in a steam boiler continually increases as the boiler is worked owing to the evaporation of the water into steam, leaving behind the solid or residual matter originally contained in solution in the water. It is important that the density should not be allowed to increase beyond a certain degree, and it has hitherto been the practice to ascertain the density of the water by taking samples from the boiler from time to time, and then ascertaining the density of the samples by means of a hydrometer.

The invention consists of apparatus or instrument affixed to the boiler or evaporating plant at or near the water line, comprising a gauge similar to an ordinary water level gauge but filled with condensed or pure water, this gauge opening at its upper end into the steam space and at its lower end into the water or liquid through a pipe maintained at the boiler temperature, and extending down to the bottom or nearly to the bottom of the boiler, vessel or pan. This gauge is preferably used in conjunction with an ordinary water level gauge and the difference in level of the water or liquid in the two gauge glasses indicates the density of the liquid in the boiler or evaporator.

The invention will be fully described with reference to the accompanying drawings, in which, Figures 1 and 2 are front and side elevations respectively of one form of the density gauge.

Figure 3 is a front elevation of another form of the density gauge.

Figures 4 and 5 are front and side elevation respectively of another form.

A steam boiler or evaporating plant is usually provided at its front end with one or two water gauges for indicating the water level in the boiler, the top of each gauge being connected to the steam space in the boiler and the bottom of each to the water space just below the low water level.

In carrying out the invention, in addition to the water gauge or gauges, or if desired where two are employed in substitution for one of them, I employ an additional gauge A affixed to the boiler, open at its upper end to the steam space and to a source of supply of fresh water, and connected at its lower end to the bottom of the boiler or plant by means of an extension pipe $a$ which is maintained at the boiler temperature.

Figure 6:
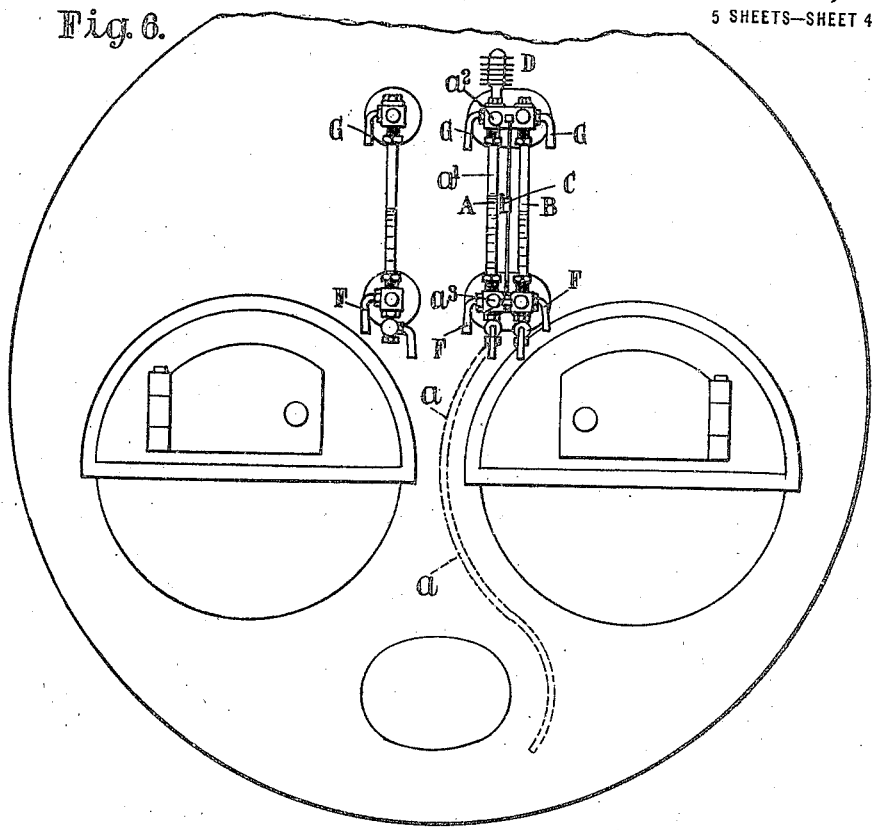
Figures 6 and 7 are front elevations showing different forms of the invention applied to a Lancashire boiler.

In the form shown in Figures 1, 2 and 6, the density gauge comprises the two gauges A and B with the usual boiler connections $a^2$ and $a^3$ at the top and bottom. The gauge B is constructed as an ordinary water level gauge open through $a^2$ at the top to the steam space, and through $a^3$ at the bottom to the water space of the boiler a little below the low water level. The gauge A is of similar construction to the water gauge B, but it has some means by which fresh water can be supplied to its gauge tube $a'$ such as a condenser D for condensing pure water from the steam. At the top the tube $a'$ is open through $a^2$ to the steam space of the boiler, but at the bottom it is connected to a long tube or pipe $a$ inside the boiler and extending down to or nearly to the bottom of the boiler. It is of great importance to maintain the water in the tube $a$ at the boiler temperature, because the density of water varies substantially with the temperature, and if the tube $a$ were outside the boiler and exposed so that the water in it would be comparatively cool, no reliable indication of the difference of density would be given by the gauge. The extension tube $a$ is preferably fitted to the socket of gauge tube $a'$ inside the gauge connection $a^3$ by a T-fitting, the upper end $a^4$ of the tube $a$ extending up into the steam space; this extension $a^4$ is not essential to the working of the instrument but is advantageous because it prevents steam bubbles from entering the gauge glass. A pointer or indicator C may be mounted between the two glass tubes, with or without a scale $c$ to indicate the difference in level of the water in the two tubes, the gauge B containing the denser boiler water showing the level of the water in the boiler and the gauge A containing fresh water showing a higher level as the density of the boiler water increases. The indicator C is shown as being mounted on a threaded spindle which can be turned by the milled head $f$ at the bottom for adjusting the indicator to the water level. The water in the tubes of both gauges A and B will be cooled down somewhat below the boiler temperature, but the water in the tube $a$ connected to the gauge A is kept at the full boiler temperature, thus insuring that the heights of the water in the two gauges A and B will give a reliable indication of the density of the boiler water by comparison of the level in gauge B with a substantially equivalent column of pure water in gauge A at the same temperature. Steam condensed in the condenser D runs down into the gauge glass $a'$, and maintains this and the tube $a$ supplied with pure water.

In the form shown in Figure 3 the construction and operation are similar to what has been described with reference to Figures 1 and 2, the boiler mounts or attachments being of a different but well known pattern except that a branch connection $a^5$ from gauge A connects with the tube $a$ inside the boiler.

Figure 7:
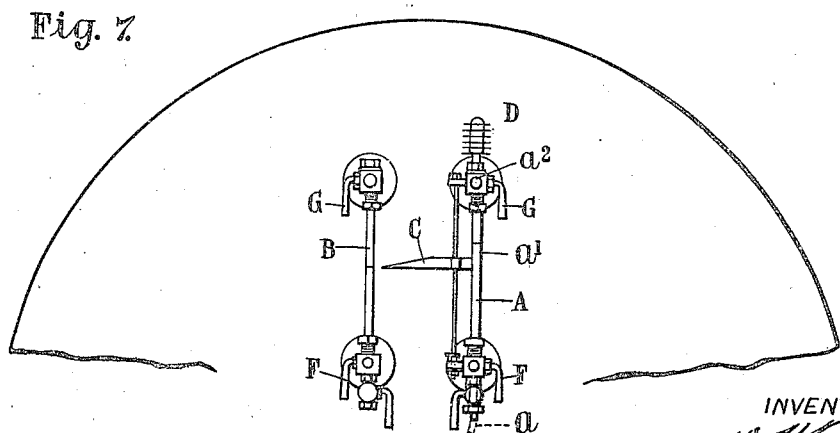

In the form shown in Figures 4, 5 and 7 the density gauge A is similar to that shown in Figures 1 and 2, but the water level gauge is omitted therefrom, the density gauge being used with an ordinary and separately mounted water level gauge B as shown in Figure 7.

The condenser D may be of any convenient construction such as a chamber with cooling fins as shown, or a coil within a cooling chamber in which sufficient steam will be condensed to keep the glass tube $a'$ and extension pipe $a$ supplied with fresh water.

Instead of a condenser an inlet pipe may bring a supply of fresh water from the feed pipe to the top or bottom of the glass tube $a'$.

The extension pipe $a$ may be placed either, inside or outside the boiler but preferably the former. If outside the boiler the pipe $a$ should be steam jacketed, so as to keep the water in the pipe $a$ at the same temperature as the water in the boiler; or the pipe $a$ may be enclosed in a tube E through which boiler water circulates as in Figure 9.

Figure 8:
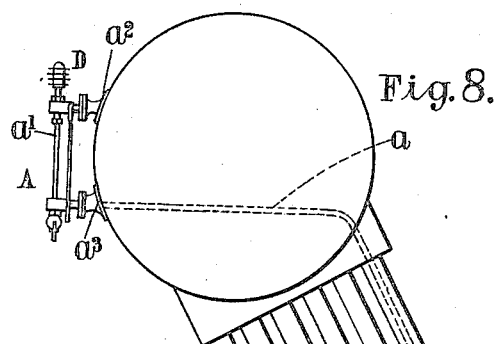
Figure 8 is a sectional elevation showing the invention applied to a water tube boiler.
Figure 9:
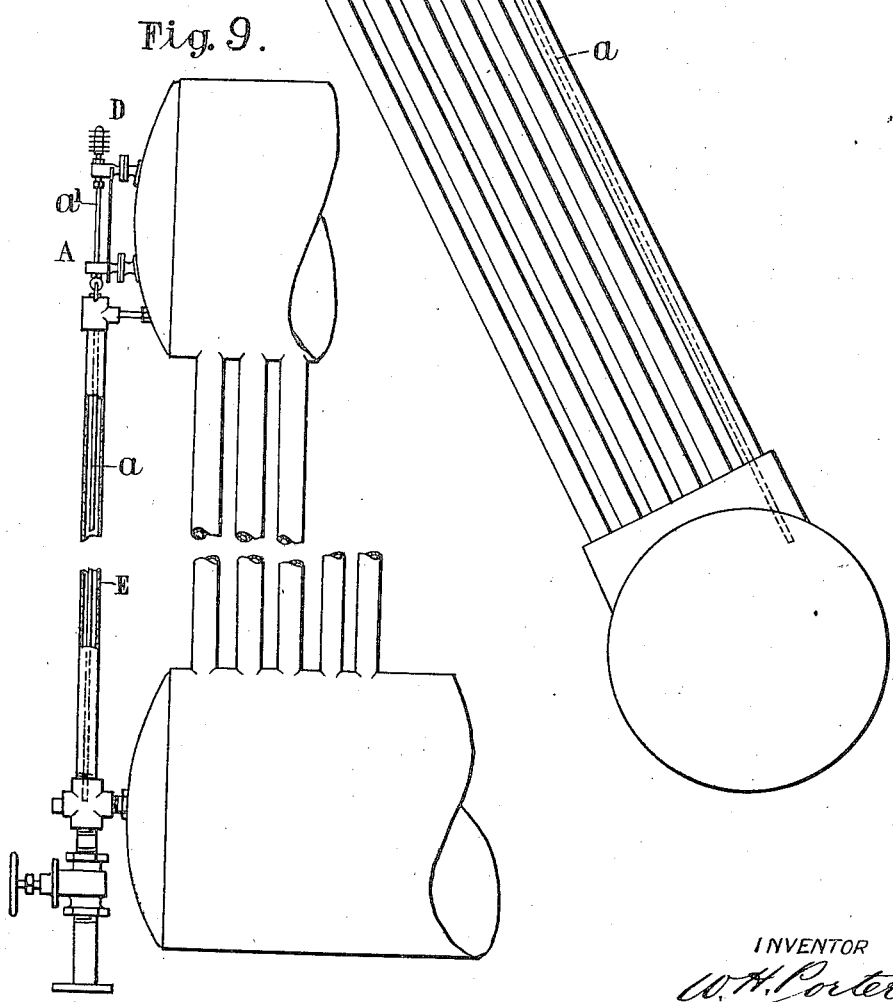
Figure 9 is a sectional elevation showing the invention applied in another way to a water tube boiler.

The arrangement of Figures 8 and 9, will need no further description in view of the explanation of the other constructions given above.

In each of the forms of the invention above described, taps or valves F, G are provided for cutting off the gauge from the steam and water when required.

In applying the invention to other evaporating plants two gauges as hereinbefore described are employed, one connected to the liquid in the plant and the other to the fresh liquid supply or to a condenser in a manner similar to that described with reference to a steam boiler.

In operation, when the boiler or plant is filled with fresh water or liquid, the level of the water in the two gauges A and B will be equal, the water in both gauges being then fresh. As the water or liquor in the boiler becomes denser or concentrated, consequent upon the evaporation and drawing off of steam, the fresh water which is maintained in the gauge A and pipe $a$ will rise to a higher level than that in the gauge B and the difference in the two levels will indicate the density of the water or liquor in the boiler or plant, the water in the gauge A being maintained fresh by the condensation of steam in the condenser D or by a fresh supply of water as already explained. Any excess of condensed or fresh water flows out in to the boiler from the bottom of the pipe $a$.

Although it is obviously convenient to use the gauge according to the invention, in conjunction with an ordinary water level gauge showing the boiler water level as described above, yet it must be understood that any alternative method of indicating the boiler water level might be employed. For example the form of gauge according to the invention could be used alone if, after taking a reading with it while filled with condensed water it were blown through, and then allowed to fill at once with boiled water the level of which would be read and compared with the condensed water reading. The two gauges placed side by side as previously described are obviously more convenient to use for most purposes however, as a reading can be taken from them at any time by direct comparison.

Having thus described my invention what I claim as new and desire to secure by Letters Patent is:—

1. An apparatus for indicating the density of liquid in steam boilers, evaporating plants, and the like comprising a gauge glass with fittings therefor, a tube extending from the lower end of the gauge glass to near the bottom of the boiler, means for maintaining the liquid in said tube substantially at the boiler temperature means connecting the upper end of the gauge glass to the steam space in the boiler, and means for supplying fresh water to the gauge glass.

2. An apparatus for indicating the density of water in a steam boiler comprising a plurality of gauge glasses, fittings for mounting said gauge glasses on the boiler, and comprising means including valves connecting the upper ends of the gauge glasses to the steam space in the boiler, and means including valves connecting the lower end of one of the gauge glasses, to the water space in the boiler, a condenser mounted at the upper end of and communicating with the second gauge glass, a tube leading from the lower end of the second gauge glass to the inside of the boiler to near the bottom thereof, and means between said two glasses for reading the difference in level of the liquid in said gauge glasses.

3. An apparatus for indicating the density of water in a steam boiler comprising a plurality of gauge glasses, fittings for mounting said gauge glasses on the boiler, and comprising means including valves connecting the upper ends of the gauge glasses to the steam space in the boiler, and means including valves connecting the lower end of one of the gauge glasses to the water space in the boiler, a condenser mounted at the upper end of and communicating with the second gauge glass, a tube leading from the lower end of the second gauge to the inside of the boiler to near the bottom thereof, a threaded spindle rotatably mounted between said gauge glasses with means for rotating said spindle, an indicator mounted on said spindle, said indicator being adapted to be raised and lowered by rotating the spindle, and means on said indicator for reading the difference in level of the liquid in said gauge glasses.

4. An apparatus for indicating the density of water in a steam boiler comprising a plurality of gauge glasses, fittings for mounting said gauge glasses on the boiler, and comprising means including valves connecting the upper ends of the gauge glasses to the steam space in the boiler, and means including valves connecting the lower end of one of the gauge glasses to the water space in the boiler, a condenser mounted at the upper end of and communicating with the second gauge glass, a tube leading from the lower end of the second gauge glass to the inside of the boiler to near the bottom thereof, a jacket around said tube, said jacket communicating with the interior of the boiler near the bottom thereof so that the liquid in the tube will be maintained substantially at the boiler temperature.

5. An apparatus for indicating the density of water in a steam boiler comprising a plurality of gauge glasses, fittings for mounting said gauge glasses on the boiler, and comprising means including valves connecting the upper ends of the gauge glasses to the steam space in the boiler, and means including valves connecting the lower end of one of the gauge glasses to the water space in the boiler, a condenser mounted at the upper end and communicating with a second gauge glass, a tube leading from the lower end of the second gauge glass to the inside of the boiler to near the bottom thereof, a second tube leading from said first tube to the steam space of the boiler, and means between said two gauge glasses for reading the difference in level of the liquid in said gauge glasses.

WILFRID HAROLD PORTER.